US011817607B2

(12) United States Patent
Morioka

(10) Patent No.: US 11,817,607 B2
(45) Date of Patent: Nov. 14, 2023

(54) MEMBRANE ELECTRODE ASSEMBLY AND POLYMER ELECTROLYTE FUEL CELL

(71) Applicant: TOPPAN PRINTING CO., LTD., Tokyo (JP)

(72) Inventor: Hiroyuki Morioka, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 60 days.

(21) Appl. No.: 17/491,888

(22) Filed: Oct. 1, 2021

(65) Prior Publication Data

US 2022/0021014 A1    Jan. 20, 2022

Related U.S. Application Data

(63) Continuation of application No. PCT/JP2020/016027, filed on Apr. 9, 2020.

(30) Foreign Application Priority Data

Apr. 9, 2019    (JP) ................... 2019-074379

(51) Int. Cl.
*H01M 8/1048* (2016.01)
*H01M 4/86* (2006.01)
(Continued)

(52) U.S. Cl.
CPC ....... *H01M 8/1048* (2013.01); *H01M 4/8657* (2013.01); *H01M 8/04149* (2013.01);
(Continued)

(58) Field of Classification Search
CPC ........... H01M 8/1048; H01M 8/04149; H01M 8/04164; H01M 8/1004;
(Continued)

(56) References Cited

U.S. PATENT DOCUMENTS

2006/0204833 A1    9/2006  Nomi et al.
2008/0241641 A1*  10/2008  Kurita ................. H01M 8/1004
                                            156/276
(Continued)

FOREIGN PATENT DOCUMENTS

CN    101071874 A    11/2007
EP    3 866 232 A1    8/2021
(Continued)

OTHER PUBLICATIONS

International Searching Authority, "International Search Report," issued in connection with International Patent Application No. PCT/JP2020/016027, dated Jul. 7, 2020, 6 pages.

(Continued)

*Primary Examiner* — Matthew W Van Oudenaren
(74) *Attorney, Agent, or Firm* — Foley & Lardner LLP

(57) ABSTRACT

A membrane electrode assembly and a polymer electrolyte fuel cell that are capable of improving water release in a high current region, where a large amount of water is generated, without impairing water retention under low humidity conditions, and also capable of exhibiting high power generation performance and durability under high humidity conditions, and also reducing the production cost of the electrode catalyst layer. A membrane electrode assembly of the present embodiment includes a polymer electrolyte membrane, and a pair of electrode catalyst layers sandwiching the polymer electrolyte membrane. At least one of the pair of electrode catalyst layers contains catalyst-supporting particles having a hydrophobic coating, hydrophobic polymer fibers, and a polymer electrolyte.

12 Claims, 1 Drawing Sheet

(51) Int. Cl.
- *H01M 8/04119* (2016.01)
- *H01M 8/1004* (2016.01)
- *H01M 8/10* (2016.01)
- *H01M 4/92* (2006.01)
- *H01M 8/1018* (2016.01)
- *H01M 4/90* (2006.01)

(52) U.S. Cl.
CPC ..... *H01M 8/04164* (2013.01); *H01M 8/1004* (2013.01); *H01M 4/8652* (2013.01); *H01M 4/8663* (2013.01); *H01M 4/9083* (2013.01); *H01M 4/926* (2013.01); *H01M 8/1018* (2013.01); *H01M 2008/1095* (2013.01)

(58) Field of Classification Search
CPC ....... H01M 2008/1095; H01M 4/8657; H01M 4/9083; H01M 4/8663; H01M 4/925; H01M 4/9075; H01M 4/8647; H01M 4/8652; H01M 4/8828; H01M 4/8832; H01M 4/8835; H01M 4/8839; H01M 4/926

See application file for complete search history.

(56) References Cited

U.S. PATENT DOCUMENTS

| | | | |
|---|---|---|---|
| 2009/0081526 A1* | 3/2009 | Hwang | H01M 8/0239 429/450 |
| 2014/0051013 A1* | 2/2014 | Elabd | D01D 5/0061 427/77 |

FOREIGN PATENT DOCUMENTS

| | | | |
|---|---|---|---|
| JP | H07-022034 | A | 1/1995 |
| JP | 2006-120506 | A | 5/2006 |
| JP | 2006-252948 | A | 9/2006 |
| JP | 2006-332041 | A | 12/2006 |
| JP | 2007-80726 | A | 3/2007 |
| JP | 2007-87651 | A | 4/2007 |
| JP | 2007-141588 | A | 6/2007 |
| JP | 2009218184 | * | 9/2009 |

OTHER PUBLICATIONS

International Searching Authority, "Written Opinion," issued in connection with International Patent Application No. PCT/JP2020/016027, dated Jul. 7, 2020, 3 pages.

Extended European Search Report issued in corresponding European Patent Application No. 20788387.7, dated Jan. 31, 2023.

* cited by examiner

MEMBRANE ELECTRODE ASSEMBLY AND POLYMER ELECTROLYTE FUEL CELL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/016027, filed on Apr. 9, 2020, which is based upon and claims the benefit of priority to Japanese Patent Application No. 2019-074379, filed on Apr. 9, 2019; the disclosures of which are incorporated herein by reference in their entireties.

TECHNICAL FIELD

The present invention relates to membrane electrode assemblies and polymer electrolyte fuel cells.

BACKGROUND

Fuel cells are power generation systems for generating heat and electricity simultaneously by using a fuel gas containing hydrogen and an oxidant gas containing oxygen to cause a reaction that is the reverse of water electrolysis at electrodes containing a catalyst. This power generation system has features such as high efficiency, low environmental load and low noise compared to conventional power generation systems, and has received attention as a future clean energy source. There are various types of fuel cells depending on the type of ion conductor used. Fuel cells using a proton-conductive polymer membrane are called polymer electrolyte fuel cells.

Among fuel cells, polymer electrolyte fuel cells, which can be used at around room temperature, are expected to be used as in-vehicle power supplies, stationary household power supplies, and the like, and various research and development has been carried out in recent years. A polymer electrolyte fuel cell is a battery composed of a membrane electrode assembly (hereinafter, also referred to as an MEA) in which a polymer electrolyte membrane is sandwiched by a pair of electrode catalyst layers, which is in turn sandwiched by a pair of separators.

One of the separators has a gas flow path for supplying a fuel gas containing hydrogen to one of the electrodes, and the other of the separators has a gas flow path for supplying an oxidant gas containing oxygen to the other of the electrodes.

The electrode to which a fuel gas is supplied is hereinafter referred to as a fuel electrode, and the electrode to which an oxidant gas is supplied is hereinafter referred to as an air electrode. These electrodes include an electrode catalyst layer containing a polymer electrolyte and carbon particles supporting a catalyst such as a platinum group noble metal (catalyst-supporting particles), and a gas diffusion layer having gas-permeability and electron conductivity. The respective gas diffusion layers constituting the electrodes are disposed to face the separator, that is, between the electrode catalyst layer and the separator.

In order to improve the output density of the fuel cell, efforts have been made to increase gas diffusibility in the electrode catalyst layer. One of them is related to micropores in the electrode catalyst layer. The micropores in the electrode catalyst layer are located to face the separator with the gas diffusion layer interposed therebetween, and serve as channels through which a plurality of substances are transported. The micropores in the fuel electrode have functions of smoothly supplying a fuel gas to a three-phase interface, which is a redox reaction field, and supplying water for promoting smooth transfer of the generated protons in the polymer electrolyte membrane. The micropores in the air electrode have functions of supplying an oxidant gas and smoothly removing water generated by an electrode reaction.

There have been issues in practical use of polymer electrolyte fuel cells, such as improvement in output density and durability. The largest issue is cost reduction (cost saving).

One of the measures for reducing the cost is removal of a humidifier. The polymer electrolyte membrane located at the center of the membrane electrode assembly is typically made of a perfluorosulfone film or a hydrocarbon-based film. For obtaining high proton conductivity, it is necessary to control the moisture content to be close to the saturated water vapor pressure of the atmosphere, and currently water is externally supplied by using a humidifier.

Meanwhile, in order to reduce power consumption and simplify systems, development has been undertaken for polymer electrolyte membranes which do not require a humidifier and exhibit sufficient proton conductivity even under low humidity conditions.

For example, PTL 1 has proposed a method of providing a humidity control film sandwiched between the electrode catalyst layer and the gas diffusion layer, for example, so that the fuel cell has improved water retention under low humidity conditions. According to the method described in PTL 1, the humidity control film made of a conductive carbonaceous powder and polytetrafluoroethylene performs humidity control to prevent drying-up.

Further, PTL 2 describes a method of providing grooves on a surface of a catalyst electrode layer in contact with a polymer electrolyte membrane. According to this method, grooves having a 0.1 to 0.3 mm width formed on a surface of the catalyst electrode layer prevent deterioration of the power generation performance under low humidity conditions.

Electrode catalyst layers having enhanced water retention may have a problem of occurrence of a phenomenon called "flooding" in a high current region where a large amount of water is generated. The flooding may disturb transport of substances at the fuel electrode and the air electrode, which may stop or reduce the power generation reaction. In order to overcome this problem, configurations to enhance water release have been discussed so far (for example, see PTLs 3, 4, 5, and 6).

CITATION LIST

Patent Literature

PTL 1: JP 2006-252948 A; PTL 2: JP 2007-141588 A; PTL 3: JP 2006-120506 A; PTL 4: JP 2006-332041 A; PTL 5: JP 2007-87651 A; PTL 6: JP 2007-80726 A.

SUMMARY OF THE INVENTION

Technical Problem

According to methods described in PTLs 5 and 6, the electrode catalyst layer is expected to have improved water retention under low humidity conditions in addition to enhanced water release (which does not impair removal of water generated by an electrode reaction).

However, there is a room for improvement in fuel cells including the electrode catalyst layers produced by such methods in terms of power generation performance and durability under low humidity conditions. Further, since these methods are complicated, there is room for improvement in reducing the production cost of the electrode catalyst layers.

The present invention has been made focusing on the above points, and is directed to provide a membrane electrode assembly and a polymer electrolyte fuel cell assembly capable of improving water release under low humidity conditions without impairing water retention for water generated by an electrode reaction, and exhibiting high power generation performance and durability under low humidity conditions, while reducing the production cost of the electrode catalyst layer.

Solution to Problem

In order to solve the problem, an aspect of the present invention is a membrane electrode assembly including: a polymer electrolyte membrane; and a pair of electrode catalyst layers sandwiching the polymer electrolyte membrane, wherein at least one of the electrode catalyst layers includes: catalyst-supporting particles having a hydrophobic coating; a polymer electrolyte; and hydrophobic polymer fibers.

Further, another aspect of the present invention is a polymer electrolyte fuel cell including: a membrane electrode assembly; a pair of gas diffusion layers sandwiching the membrane electrode assembly; and a pair of separators facing each other with the membrane electrode assembly and the pair of gas diffusion layers interposed therebetween.

Advantageous Effects of the Invention

According to the aspect of the membrane electrode assembly of the present invention, it is possible to provide a membrane electrode assembly capable of improving water release under low humidity conditions without impairing water retention for water generated by an electrode reaction, and exhibiting high power generation performance and durability under low humidity conditions, and also reducing the production cost of the electrode catalyst layer.

Further, according to the aspect of the polymer electrolyte fuel cell of the present invention, it is possible to improve water release under low humidity conditions without impairing water retention for water generated by an electrode reaction, and exhibit high power generation performance and durability under low humidity conditions, in addition to reducing the production cost of the electrode catalyst layer.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

With reference to the accompanying drawings, some embodiments of the present invention will be described.

Membrane Electrode Assembly

Figure 1:
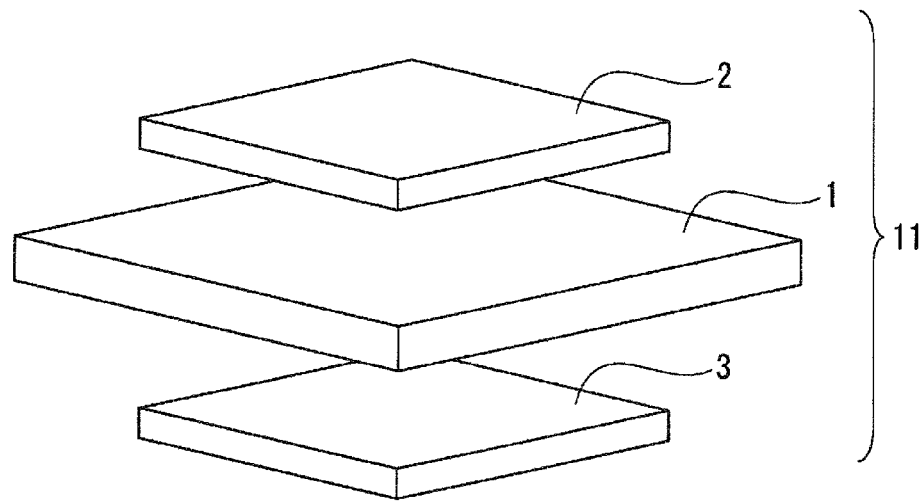
FIG. 1 is an exploded perspective view schematically illustrating a membrane electrode assembly having an electrode catalyst layer according to an embodiment of the present invention.

As shown in FIG. 1, a membrane electrode assembly 11 of the present embodiment includes a polymer electrolyte membrane 1, and a pair of electrode catalyst layers 2 and 3 sandwiching the polymer electrolyte membrane 1 from the upper and lower sides.

Each of the electrode catalyst layers 2 and 3 includes catalyst-supporting particles and a polymer electrolyte. At least one of the pair of electrode catalyst layers 2 and 3 includes electrolyte fibers. Hereinafter, the electrode catalyst layer including the electrolyte fibers is referred to as an "improved electrode catalyst layer." Preferably, both of the pair of electrode catalyst layers 2 and 3 are the improved electrode catalyst layers.

In the improved electrode catalyst layer, the catalyst-supporting particles have a hydrophobic coating.

The hydrophobic polymer fibers in the improved electrode catalyst layer have an average fiber length of 1 μm or more and 600 μm or less.

Preferably, the hydrophobic polymer fibers in the improved electrode catalyst layer have an average fiber diameter of 0.1 μm or more and 0.6 μm or less.

The average fiber diameter and the average fiber length of the hydrophobic polymer fibers are calculated from five hydrophobic polymer fibers arbitrarily selected in a cross-sectional image taken by a scanning electron microscope (SEM).

Further, the hydrophobic polymer fibers in the improved electrode catalyst layer have a mass of 0.05 times or more and 1.0 times or less the mass of a carrier in the catalyst-supporting particles having a hydrophobic coating.

The present invention has found that the improved electrode catalyst layer having the following configuration performs water release, although the detailed mechanism of the water release is not elucidated. However, it is presumed to be as described below. It should be noted that the present invention is not limited to the following mechanism.

The improved electrode catalyst layer having the above configuration achieves high durability and mechanical properties due to the hydrophobic polymer fibers being entangled with each other, preventing cracking that may cause a decrease in durability from occurring in the electrode catalyst layer. Further, the catalyst-supporting particles having a hydrophobic coating have affinity with hydrophobic polymer fibers. The catalyst-supporting particles and the polymer fibers are entangled with each other to form micropores in the electrode catalyst layer. It is presumed that, due to the micropores thus formed, water generated by an electrode reaction in a high current region can be released even when the electrode catalyst layer has enhanced water retention, and thus the diffusibility of the reaction gas can be improved. On the other hand, when catalyst-supporting particles having no hydrophobic coating are used, spaces formed by the entangled polymer fibers are filled with catalyst-supporting particles since they do not have affinity with the polymer fibers. Therefore, the micropores are not likely to be formed in the electrode catalyst layer, and it is presumed that the electrode catalyst layer having enhanced water retention has difficulty in releasing water generated by an electrode reaction in a high current region, and the diffusibility of the reaction gas cannot be improved.

When the average fiber length of the hydrophobic polymer fibers is less than 1 μm, it is presumed that the mechanical properties may be deteriorated due to the influence of weak entanglement between the polymer fibers. Further, when the average fiber length of the hydrophobic polymer fibers is more than 600 μm, it is presumed that an ink may not be dispersed due to strong entanglement between the polymer fibers.

When the mass of the hydrophobic polymer fibers is less than 0.05 times the mass of a carrier in the catalyst-supporting particles having a hydrophobic coating, it is presumed that water generated by an electrode reaction in a high current region may not be sufficiently released due to the influence of an insufficient amount of micropores formed in the electrode catalyst layer, which may lead to a failure in increasing the diffusibility of the reaction gas. Further, when the mass of the hydrophobic polymer fibers is more than 1.0 times the mass of a carrier in the catalyst-supporting particles having a hydrophobic coating, it is presumed that water retention may not be enhanced under low humidity conditions due to the influence of a large amount of micropores formed in the electrode catalyst layer.

When the average fiber diameter of the hydrophobic polymer fibers is less than 0.1 μm, it is presumed that micropores may not be likely to be formed in the electrode catalyst layer due to the influence of high flexibility of the hydrophobic polymer fibers. Further, when the average fiber diameter of the hydrophobic polymer fibers is more than 0.6 μm, it is presumed that the ink may not be dispersed due to the influence of high straightness of the hydrophobic polymer fibers.

According to the membrane electrode assembly 11 of the present embodiment, which is different from a conventional case where water release is enhanced by changing the configuration of the electrode catalyst layer, a decrease in power generation performance due to an increase in interface resistance does not occur. Therefore, according to the polymer electrolyte fuel cell including the membrane electrode assembly 11, the power generation performance in a high current region where a large amount of water is generated is enhanced compared with a polymer electrolyte fuel cell having a conventional membrane electrode assembly.

Polymer Electrolyte Fuel Cell

Next, with reference to FIG. 2, a polymer electrolyte fuel cell having the membrane electrode assembly 11 of the embodiment will be described.

Figure 2:
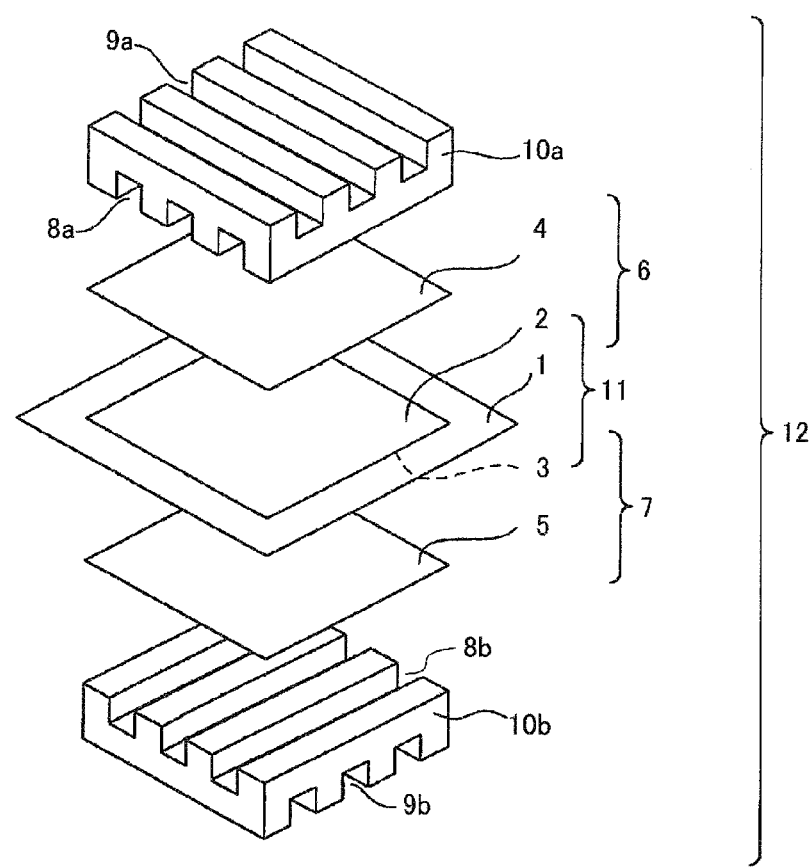
FIG. 2 is an exploded perspective view schematically illustrating a structure of a polymer electrolyte fuel cell including the membrane electrode assembly of FIG. 1.

As shown in FIG. 2, a polymer electrolyte fuel cell 12 includes an air electrode-side gas diffusion layer 4 disposed facing the electrode catalyst layer 2 of the membrane electrode assembly 11, and a fuel electrode-side gas diffusion layer 5 disposed facing the electrode catalyst layer 3. The electrode catalyst layer 2 and the gas diffusion layer 4 constitute an air electrode (cathode) 6. The electrode catalyst layer 3 and the gas diffusion layer 5 constitute a fuel electrode (anode) 7.

Further, a pair of separators 10a and 10b are disposed on the outside the gas diffusion layers 4 and 5, respectively. The separators 10a and 10b, made of a material having electrical conductivity and impermeability, include gas flow paths 8a and 8b for gas distribution, respectively, and cooling water flow paths 9a and 9b for cooling water distribution, respectively.

A fuel gas such as hydrogen gas, for example, is supplied to the gas flow path 8b of the separator 10b facing the fuel electrode 7. On the other hand, an oxidant gas such as oxygen gas, for example, is supplied to the gas flow path 8a of the separator 10a facing the air electrode 6. The hydrogen as fuel gas and the oxygen as oxidant gas can undergo an electrode reaction in the presence of catalyst to generate an electromotive force between the fuel electrode 7 and the air electrode 6.

In the polymer electrolyte fuel cell 12, a pair of separators 10a and 10b are disposed with the polymer electrolyte membrane 1, a pair of electrode catalyst layers 2 and 3, and a pair of gas diffusion layers 4 and 5 interposed therebetween. Although the polymer electrolyte fuel cell 12 shown in FIG. 2 is an example of a fuel cell having a single cell structure, the present invention can also be applied to a polymer electrolyte fuel cell in which a plurality of cells are stacked via the separator 10a or the separator 10b.

Method of Producing Electrode Catalyst Layer

Next, an example of a method of producing an improved electrode catalyst layer having the above configuration will be described.

The improved electrode catalyst layer is produced by a method including a first step and a second step described below.

The first step is a step of producing a catalyst ink containing catalyst-supporting particles having a hydrophobic coating, hydrophobic polymer fibers, a polymer electrolyte, and a solvent.

The second step is a step of producing an improved electrode catalyst layer by applying the catalyst ink obtained in the first step to a surface of a substrate and drying the solvent.

Further, an electrode catalyst layer other than the improved electrode catalyst layer may also be produced in the same manner.

Then, a pair of electrode catalyst layers 2 and 3 thus produced are bonded to an upper surface and a lower surface of the polymer electrolyte membrane 1, respectively, to obtain a membrane electrode assembly 11.

Details

The membrane electrode assembly 11 and the polymer electrolyte fuel cell 12 will be described below in further detail.

The polymer electrolyte membrane 1 may be any membrane as long as it has proton conductivity, and may be, for example, a fluorine-based polymer electrolyte membrane, or a hydrocarbon-based polymer electrolyte membrane. Examples of the fluorine-based polymer electrolyte membrane include Nafion (registered trademark) manufactured by DuPont, Flemion (registered trademark) manufactured by Asahi Glass Co., Ltd, Aciplex (registered trademark) manufactured by Asahi Kasei Corp., Gore Select (registered trademark) manufactured by Gore, and the like.

Further, examples of the hydrocarbon-based polymer electrolyte membrane include electrolyte membranes made of sulfonated polyether ketone, sulfonated polyether sulfone, sulfonated polyether ether sulfone, sulfonated polysulfide, sulfonated polyphenylene, and the like. In particular, as the polymer electrolyte membrane 1, materials based on Nafion (registered trademark) manufactured by DuPont can be preferably used.

The electrode catalyst layers 2 and 3 are formed by using the catalyst ink on respective surfaces of the polymer electrolyte membrane 1. The catalyst ink for the electrode catalyst layers 2 and 3 contains catalyst-supporting particles, a polymer electrolyte, and a solvent. Further, the catalyst ink for the improved electrode catalyst layer contains catalyst-supporting particles having a water-repellent coating, electrolyte fibers, a polymer electrolyte, and a solvent.

The polymer electrolyte contained in the catalyst ink may be made of the same material as the polymer electrolyte membrane 1 as long as the material has proton conductivity, and may be, for example, a fluorine-based polymer electrolyte or hydrocarbon-based polymer electrolyte. Examples of the fluorine-based polymer electrolyte include materials based on Nafion (registered trademark) manufactured by Du Pont. Further, examples of the hydrocarbon-based polymer electrolyte include electrolytes made of sulfonated polyether ketone, sulfonated polyether sulfone, sulfonated polyether ether sulfone, sulfonated polysulfide, sulfonated polyphenylene, and the like. In particular, as the fluorine-based polymer electrolyte, materials based on Nafion (registered trademark) manufactured by DuPont can be preferably used.

As the catalyst used in the present embodiment (hereinafter, also referred to as catalyst particles or a catalyst), for example, metals, or alloys thereof, and oxides or double oxides thereof can be used. Examples of the metals include platinum group elements such as platinum, palladium, ruthenium, iridium, rhodium, and osmium, as well as gold, iron, lead, copper, chromium, cobalt, nickel, manganese, vanadium, molybdenum, gallium, aluminum, and the like. The double oxides described herein refer to oxides composed of two metals.

When the catalyst particles are one or more metals selected from the group consisting of platinum, gold, palladium, rhodium, ruthenium, and iridium, they have good electrode reactivity and can perform efficient and stable electrode reactions. The catalyst particles made of one or more metals selected from the group consisting of platinum, gold, palladium, rhodium, ruthenium, and iridium are preferred since the polymer electrolyte fuel cell 12 including the electrode catalyst layers 2 and 3 exhibits high power generation performance.

Further, the average particle size of the above catalyst particles is preferably 0.5 nm or more and 20 nm or less, and more preferably 1 nm or more and 5 nm or less. The average particle size is measured by an X-ray diffraction method when the measurement is performed using a catalyst supported on a carrier such as carbon particles. When the measurement is performed using a catalyst which is not supported on a carrier, the average particle size is an arithmetic average grain size obtained from grain size measurement. The catalyst particles having the average particle size in a range of 0.5 nm or more and 20 nm or less are preferred since the activity and stability of the catalyst are improved.

As an electron conductive powder (carrier) which supports the above catalyst, carbon particles are typically used. The types of the carbon particles are not specifically limited as long as they are fine-grained and electrically conductive, and are not affected by the catalyst. Examples of the carbon particles include carbon black, graphite, black lead, activated carbon, carbon fibers, carbon nanotubes, and fullerenes.

The average particle size of the carbon particles is preferably 10 nm or more and 1000 nm or less, and more preferably 10 nm or more and 100 nm or less. The above average particle size is obtained from an SEM image. The carbon particles having the average particle size in a range of 10 nm or more and 1000 nm or less are preferred since the activity and stability of the catalyst are improved. They are preferred since they promote formation of electron conductive paths, and improve gas diffusibility and catalyst utilization ratio of two electrode catalyst layers 2 and 3.

The hydrophobic coating of the catalyst-supporting particles preferably has a thickness that sufficiently allows the reaction gas to permeate. Specifically, the thickness of the hydrophobic coating is preferably 40 nm or less. A thickness larger than this may hinder supply of the reaction gas to the active site. On the other hand, when the hydrophobic coating thickness is 40 nm or less, the reaction gas permeates sufficiently, while sufficient hydrophobicity can be imparted to the catalyst-supporting particles.

Further, the hydrophobic coating of the catalyst-supporting particles preferably has a thickness that sufficiently repels the generated water. Specifically, the thickness of the hydrophobic coating is preferably 2 nm or more. A thickness smaller than this may cause stagnation of the generated water and hinder supply of the reaction gas to the active site.

The hydrophobic coating of the catalyst-supporting particles is made of a fluorine-based compound having at least one polar group. Examples of the polar group include a hydroxyl group, an alkoxy group, a carboxyl group, an ester group, an ether group, a carbonate group, and an amide group. Due to the presence of the polar group, the fluorine-based compound can be immobilized on the outermost surface of the catalyst layer. A portion of the fluorine-based compound other than the polar group is preferably a structure made of fluorine and carbon due to high hydrophobicity and chemical stability. However, the structure is not limited to that described above as long as it has a sufficient hydrophobicity and chemical stability.

The hydrophobic polymer fibers may be, for example, proton conductive fibers obtained by processing a polymer electrolyte into a fibrous form. The use of the proton conductive fibers improves proton conductivity.

The proton conductive fibers may be fibers obtained by processing a proton conductive polymer electrolyte into a fibrous form. A fluorine-based polymer electrolyte, a hydrocarbon-based polymer electrolyte, or the like may be used as a material for forming the proton conductive fibers. Examples of the fluorine-based polymer electrolyte include Nafion (registered trademark) manufactured by DuPont, Flemion (registered trademark) manufactured by Asahi Glass Co., Ltd., Aciplex (registered trademark) manufactured by Asahi Kasei Corporation, and Gore Select (registered trademark) manufactured by Gore. Examples of the hydrocarbon-based polymer electrolyte include electrolytes such as sulfonated polyether ketones, sulfonated polyether sulfones, sulfonated polyether ether sulfones, sulfonated polysulfides, and sulfonated polyphenylenes. Of these materials, Nafion (registered trademark) manufactured by DuPont is preferably used as the polymer electrolyte.

The hydrophobic polymer fibers may be formed of only one of the above fibers, or two or more of the above fibers.

The solvent used as the dispersion medium of the catalyst ink is not specifically limited as long as it does not erode the catalyst-supporting particles and the polymer electrolyte, and is capable of dissolving the polymer electrolyte in a highly fluid state or dispersing the polymer electrolyte as a fine gel. Preferably, the solvent includes at least a volatile organic solvent. Examples of the solvent used as the dispersion medium of the catalyst ink include: alcohols such as methanol, ethanol, 1-propanol, 2-propanol, 1-butanol, 2-butanol, isobutylalcohol, tert-butylalcohol and pentanol; ketone-based solvents such as acetone, methylethylketone, pentanone, methylisobutylketone, heptanone, cyclohexanone, methylcyclohexanone, acetonylacetone and diisobutyl ketone; ether-based solvents such as tetrahydrofuran, dioxane, diethyleneglycol dimethyl ether, anisole, methoxytoluene and dibutyl ether; and polar solvents such as dimethylformamide, dimethylacetamide, N-methylpyrrolidone, ethylene glycol, diethylene glycol, diacetone alcohol and 1-methoxy-2-propanol. Further, a mixed solvent obtained by mixing two or more of the above materials may also be used as the solvent.

When a lower alcohol is used as a solvent used as the dispersion medium of the catalyst ink, a mixed solvent with water is preferred since the lower alcohol involves a high risk of ignition. Furthermore, water may be used as it is highly miscible with (has high affinity for) the polymer electrolyte. The additive amount of water is not specifically limited as long as the polymer electrolyte does not separate and cause white turbidity or gelation.

The catalyst ink may contain a dispersant to disperse the catalyst-supporting particles. The dispersant may be, for example, an anionic surfactant, a cationic surfactant, an amphoteric surfactant, or a nonionic surfactant.

Examples of the anionic surfactant include carboxylate type surfactants such as alkyl ether carboxylates, ether carboxylates, alkanoyl sarcosines, alkanoyl glutamates, acylglutamates, oleic acid/N-methyltaurine, potassium oleate/diethanolamine salts, alkyl ether sulfate/triethanolamine salts, polyoxyethylene alkyl ether sulfate/triethanolamine salts, amine salts of specially modified polyetherester acids, amine salts of higher fatty acid derivatives, amine salts of specially modified polyester acids, amine salts of high molecular weight polyetherester acids, amine salts of specially modified phosphate esters, amide amine salts of high molecular weight polyester acids, amide amine salts of special fatty acid derivatives, alkylamine salts of higher fatty acids, amide amine salts of high molecular weight polycarboxylic acids, sodium laurate, sodium stearate, and sodium oleate; sulfonate type surfactants such as dialkylsulfosuccinates, dialkyl sulfosuccinic acid salts, 1,2-bis(alkoxycarbonyl)-1-ethane sulfonate, alkylsulfonates, alkylsulfonic acid salts, paraffin sulfonates, α-olefin sulfonates, linear alkylbenzene sulfonates, alkylbenzene sulfonates, polynaphthylmethane sulfonates, polynaphthylmethane sulfonic acid salts, naphthalenesulfonate-formaline condensates, alkylnaphthalene sulfonates, alkanoylmethyl taurides, sodium salts of lauryl sulfate ester, sodium salts of cetyl sulfate ester, sodium salts of stearyl sulfate ester, sodium salts of oleyl sulfate ester, lauryl ether sulfate ester salts, sodium alkylbenzene sulfonates, oil-soluble alkylbenzene sulfonates, and α-olefin sulfonates; sulfate ester type surfactants such as alkylsulfate ester salts, alkyl sulfuric acid salts, alkylsulfates, alkyl ether sulfates, polyoxyethylene alkyl ether sulfates, alkyl polyethoxy sulfates, polyglycol ether sulfates, alkyl polyoxyethylene sulfates, sulfonate oils, and highly sulfonated oils; phosphate ester type surfactants such as (mono or di)alkyl phosphoric acid salts, (mono or di)alkyl phosphates, (mono or di)alkyl phosphate ester salts, alkyl polyoxyethylene phosphates, alkyl ether phosphates, alkyl polyethoxy phosphates, polyoxyethylene alkyl ethers, alkylphenyl polyoxyethylene phosphates, alkylphenyl ether phosphates, alkylphenyl polyethoxy phosphates, polyoxyethylene alkylphenylether phosphates, disodium salts of higher alcohol phosphate monoesters, disodium salts of higher alcohol phosphate diesters, and zinc dialkyl dithiophosphates.

Examples of the cationic surfactant include benzyldimethyl {2-[2-(P-1,1,3,3-tetramethylbutylphenoxy)ethoxy]ethyl}ammonium chloride, octadecylamine acetate, tetradecylamine acetate, octadecyltrimethylammonium chloride, beef tallow trimethylammonium chloride, dodecyltrimethylammonium chloride, coco trimethylammonium chloride, hexadecyltrimethylammonium chloride, behenyltrimethylammonium chloride, coco dimethylbenzylammonium chloride, tetradecyldimethylbenzylammonium chloride, octadecyldimethylbenzylammonium chloride, dioleyldimethylammonium chloride, 1-hydroxyethyl-2-beef tallow imidazoline quaternary salts, 2-heptadecenyl-hydroxyethyl imidazoline, stearamideethyldiethylamine acetate, stearamideethyldiethylamine hydrochloride, triethanolamine monostearate formate, alkylpyridium salts, higher alkylamine-ethylene oxide adducts, polyacrylamide amine salts, modified polyacrylamide amine salts, and perfluoroalkyl quaternary ammonium iodides.

Examples of the amphoteric surfactant include coco dimethyl betaine, dimethyl lauryl betaine, sodium laurylaminoethyl glycine, sodium laurylaminopropionate, stearyl dimethyl betaine, lauryl dihydroxyethyl betaine, amide betaine, imidazolinium betaine, lecithin, 3-[ω-fluoroalkanoyl-N-ethylamino]-1-propane sulfonate, and N-[3-(perfluorooctanesulfoneamide)propyl]-N,N-dimethyl-N-carboxymethylene ammonium betaine.

Examples of the nonionic surfactant include coconut fatty acid diethanolamide (1:2 type), coconut fatty acid diethanolamide (1:1 type), beef tallowate diethanolamide (1:2 type), beef tallowate diethanolamide (1:1 type), oleic acid diethanolamide (1:1 type), hydroxyethyl laurylamine, polyethylene glycol laurylamine, polyethylene glycol cocoamine, polyethylene glycol stearylamine, polyethylene glycol beef tallow amine, polyethylene glycol beef tallow propylenediamine, polyethylene glycol dioleylamine, dimethyllaurylamine oxide, dimethylstearylamine oxide, dihydroxyethyllaurylamine oxide, perfluoroalkylamine oxides, polyvinylpyrrolidone, higher alcohol-ethylene oxide adducts, alkyl phenol-ethylene oxide adducts, fatty acid-ethylene oxide adducts, propylene glycol-ethylene oxide adduct, fatty acid esters of glycerin, fatty acid esters of pentaerithritol, fatty acid esters of sorbitol, fatty acid esters of sorbitan, and fatty acid esters of sugar.

Among the above surfactants, sulfonate type surfactants such as alkylbenzene sulfonic acids, oil-soluble alkylbenzene sulfonic acids, α-olefin sulfonic acids, sodium alkylbenzene sulfonates, oil-soluble alkylbenzene sulfonates, and α-olefin sulfonates can be preferably used as a dispersant in view of the dispersing effect for carbons and the influence of residual dispersant on catalyst performance, and the like.

In general, the micropore volume decreases with an increase in the amount of polymer electrolyte in the catalyst ink. On the other hand, the micropore volume increases with an increase in the quantity of carbon particles in the catalyst ink. Further, the use of dispersant causes a decrease in the micropore volume.

The catalyst ink may be subjected to dispersion treatment as necessary. The viscosity of the catalyst ink and the size of particles included in the catalyst ink can be controlled by the conditions of the dispersion treatment of the catalyst ink. The dispersion treatment can be performed by using various devices. The method of dispersion treatment is not specifically limited. Examples of the dispersion treatment include treatment using a ball mill or a roll mill, treatment using a shear mill, treatment using a wet type mill, and ultrasonic dispersion treatment. Alternatively, a homogenizer that performs agitation using centrifugal force may also be used. As the dispersion time increases, the aggregates of catalyst-supporting particles are broken and the volume of micropores decreases.

When the solid content in the catalyst ink is excessively large, the viscosity of the catalyst ink increases and cracking is likely to occur on the surface of the electrode catalyst layers 2 and 3. On the other hand, when the solid content in the catalyst ink is excessively small, the film formation rate is very slow, which reduces the productivity. Therefore, the solid content in the catalyst ink is preferably 1 mass % (wt %) or more and 50 mass % or less.

The solid content is composed of the catalyst-supporting particles and the polymer electrolyte. When the content of the catalyst-supporting particles in the solid content increases, the viscosity increases for the same solid content. On the other hand, when the content of the catalyst-supporting particles in the solid content decreases, the viscosity decreases for the same solid content. Therefore, the content of the catalyst-supporting particles in the solid content is preferably 10 mass % or more and 80 mass % or less. Further, the viscosity of the catalyst ink is preferably approximately 0.1 cP or more and 500 cP or less (0.0001 Pa·s or more and 0.5 Pa·s or less), and more preferably 5 cP or more and 100 cP or less (0.005 Pa·s or more and 0.1 Pa·s or less). Furthermore, the viscosity can also be controlled by adding the dispersant at the time of dispersion of the catalyst ink.

In addition, the catalyst ink may contain a pore-forming agent. The pore-forming agent can be removed after the electrode catalyst layer is formed to thereby form micropores. The pore-forming agent include materials soluble in acid, alkali or water, sublimation materials such as camphor, and materials which decompose by heat. When the pore-forming agent is soluble in warm water, it can be removed by water generated during power generation.

Examples of the pore-forming agent soluble in acid, alkali or water may include inorganic salts soluble in an acid, inorganic salts soluble in an alkali aqueous solution, metals soluble in an acid or alkali, water-soluble inorganic salts, and water-soluble organic compounds. Examples of the inorganic salts soluble in an acid may include calcium carbonate, barium carbonate, magnesium carbonate, magnesium sulfate, and magnesium oxide. Examples of the inorganic salts soluble in an alkali aqueous solution may include alumina, silica gel, and silica sol. Examples of the metals soluble in an acid or alkali may include aluminum, zinc, tin, nickel, and iron. Examples of the water-soluble inorganic salts may include sodium chloride, potassium chloride, ammonium chloride, sodium carbonate, sodium sulfate, and monobasic sodium phosphate. Examples of the water-soluble organic compounds may include polyvinyl alcohol and polyethylene glycol.

The above pore-forming agents may be used singly or in combination of two or more, but a combination of two or more is preferably used.

The method of applying the catalyst ink onto the substrate may be, for example, doctor blading, dipping, screen printing, roll coating, or the like.

The electrode catalyst layers 2 and 3 can be produced by using a transfer sheet as a substrate.

The transfer sheet used as the substrate may be made of a material having good transfer properties. For example, fluororesins such as ethylene tetrafluoroethylene copolymer (ETFE), tetrafluoroethylene hexafluoropropylene copolymer (FEP), tetrafluoro perfluoroalkylvinylether copolymer (PFA), and polytetrafluoroethylene (PTFE) can be used. Further, polymer sheets or polymer films such as polyimide, polyethylene terephthalate, polyamide (Nylon (registered trademark)), polysulfone, polyethersulfone, polyphenylene sulfide, polyether ether ketone, polyetherimide, polyarylate, and polyethylene naphthalate can be used as the transfer sheet. When the transfer sheet is used as the substrate, the transfer sheet can be removed after the electrode film, which is a coating film after removal of the solvent, is bonded to the polymer electrolyte membrane 1 to thereby obtain a membrane electrode assembly 11 in which the electrode catalyst layers 2 and 3 are disposed on respective surfaces of the polymer electrolyte membrane 1.

The gas diffusion layers 4 and 5 can be made of a material having gas diffusibility and electrical conductivity. For example, porous carbon materials such as carbon cloth, carbon paper, and nonwoven fabric can be used as the gas diffusion layers 4 and 5.

For the separators 10 (10a, 10b), a carbon type, a metal type, or the like can be used. The gas diffusion layers 4 and 5 may also be integrally formed with the separators 10 (10a, 10b). When the separators 10 (10a, 10b) or the electrode catalyst layers 2 and 3 function as the gas diffusion layers 4 and 5, the gas diffusion layers 4 and 5 may be omitted. Other additional devices such as a gas supply device, a cooling device, and the like can be assembled to thereby produce a polymer electrolyte fuel cell 12.

Effects and Others

The present embodiment describes the membrane electrode assembly 11 exhibiting high power generation performance under high humidity conditions, the method for producing the same, and the polymer electrolyte fuel cell 12 having the membrane electrode assembly 11. The electrode catalyst layers 2 and 3 in the membrane electrode assembly 11 according to the present embodiment achieve high durability and mechanical properties due to the hydrophobic polymer fibers being entangled with each other, preventing cracking that may cause a decrease in durability from occurring in the electrode catalyst layer. Further, the catalyst-supporting particles having a hydrophobic coating have affinity with hydrophobic polymer fibers. The catalyst-supporting particles and the polymer fibers are entangled with each other to form micropores in the electrode catalyst layer. Due to the micropores thus formed, water generated by an electrode reaction in a high current region can be released even when the electrode catalyst layer has enhanced water retention, and thus the diffusibility of the reaction gas can be improved.

The membrane electrode assembly produced by the method of producing an electrode catalyst layer according to the present embodiment has improved water release in a high current region, where a large amount of water is generated, without impairing water retention under low humidity conditions, and also exhibits high power generation performance and durability under high humidity conditions. Further, the method of producing an electrode catalyst layer according to the present embodiment is capable of efficiently, economically, and easily producing the aforementioned membrane electrode assembly.

That is, the aforementioned membrane electrode assembly can be produced by simply forming an electrode catalyst layer by using a catalyst ink in which a carbon catalyst supporting platinum (catalyst-supporting particles) having a hydrophobic coating, a polymer electrolyte, and hydrophobic polymer fibers are dispersed in a solvent.

Therefore, the membrane electrode assembly can be produced without requiring complicated production steps, and the use of the electrode catalyst layer produced by the above procedure can improve both the water retention and the diffusibility of the reaction gas. Accordingly, there is no need to provide a special means such as a humidifier, for example, and thus the cost can be reduced.

Further, only one of the electrode catalyst layers 2 and 3 disposed on respective surfaces of the polymer electrolyte membrane 1 may be an improved electrode catalyst layer. In this case, the improved electrode catalyst layer is preferably disposed on the air electrode (cathode)-side, where water is generated due to the electrode reaction. However, in view of the water release in a high current region, it is more preferable that the improved electrode catalyst layers are disposed on both surfaces of the polymer electrolyte membrane 1.

While the embodiment of the present invention has been described in detail, the invention is not limited to the above embodiment. Modifications without departing from the scope of the present invention are encompassed by the present invention.

EXAMPLES

Methods for producing an improved electrode catalyst layer for the electrode catalyst layer constituting the polymer electrolyte fuel cell of the present embodiment, and methods for producing a membrane electrode assembly will be described below by using specific examples and comparative examples. However, the present embodiment is not limited to the following examples and comparative examples.

In the following examples, a case where both of the pair of electrode catalyst layers are improved electrode catalyst layers will be described. Only one of the pair of electrode catalyst layers may also be an improved electrode catalyst layer.

Example 1

Preparation of Catalyst Ink

A carbon catalyst supporting platinum (catalyst-supporting particles) having a 25 nm hydrophobic coating at a support density of 50 mass %, a 25 mass % polymer electrolyte solution, and proton conductive fibers (hydrophobic polymer fibers) having an average fiber length of 150 µm and an average fiber diameter of 0.3 µm were mixed in a solvent, and the mixture was subjected to dispersion treatment by using a planetary ball mill. The dispersion was performed for 30 minutes to prepare a catalyst ink. In the prepared catalyst ink, a composition ratio of the starting materials of proton conductive fibers:carbon carrier:polymer electrolyte was 0.3:1:0.6 in mass ratio. In the solvent of the catalyst ink, the ratio of ultra pure water and 1-propanol was 1:1 by volume. Further, the solid content of the catalyst ink was adjusted to 15 mass %.

Substrate

A polytetrafluoroethylene (PTFE) sheet was provided as a substrate constituting a transfer sheet.

Method of Forming Electrode Catalyst Layer on Substrate

The catalyst ink prepared as described above was applied to the substrate by doctor blading, and then dried at 80° C. in air atmosphere. The applied amount of the catalyst ink was adjusted so that the supported platinum was present at 0.05 mg/cm$^2$ in the electrode catalyst layer on the fuel electrode (anode), and the supported platinum was present at 0.2 mg/cm$^2$ in the electrode catalyst layer on the air electrode (cathode).

Production of Membrane Electrode Assembly

The substrate on which the electrode catalyst layer as an anode was formed and the substrate on which the electrode catalyst layer as a cathode was formed were each punched out into 5 cm×5 cm pieces, and transferred onto respective surfaces of the polymer electrolyte membrane in the conditions of a transfer temperature of 120° C. and a transfer pressure of 5.0×10$^6$ Pa. Thus, a membrane electrode assembly of the example was produced.

Comparative Example 1

Preparation of Catalyst Ink

A catalyst ink of Comparative Example 1 was prepared in the same manner as in Example 1 except that the carbon catalyst supporting platinum (catalyst-supporting particles) does not have a hydrophobic coating. In the prepared catalyst ink, a composition ratio of the starting materials of proton conductive fibers:carbon carrier:polymer electrolyte was 0.3:1:0.6 in mass ratio. In the solvent of the catalyst ink, the ratio of ultra pure water and 1-propanol was 1:1 by volume. Further, the solid content of the catalyst ink was adjusted to 15 mass %.

Substrate

A polytetrafluoroethylene (PTFE) sheet was provided as a substrate constituting a transfer sheet.

Method of Forming Electrode Catalyst Layer on Substrate

The catalyst ink prepared as described above was applied to the substrate by doctor blading, and then dried at 80° C. in air atmosphere. The applied amount of the catalyst ink was adjusted so that the supported platinum was present at 0.05 mg/cm$^2$ in the electrode catalyst layer on the fuel electrode (anode), and the supported platinum was present at 0.2 mg/cm$^2$ in the electrode catalyst layer on the air electrode (cathode).

Production of Membrane Electrode Assembly

The substrate on which the electrode catalyst layer as an anode was formed and the substrate on which the electrode catalyst layer as a cathode was formed were each punched out into 5 cm×5 cm pieces, and transferred onto respective surfaces of the polymer electrolyte membrane in the conditions of a transfer temperature of 120° C. and a transfer pressure of 5.0×10$^6$ Pa. Thus, a membrane electrode assembly of Comparative Example 1 was produced.

Comparative Example 2

Preparation of Catalyst Ink

A catalyst ink of Comparative Example 2 was prepared in the same manner as in Example 1 except that the proton conductive fibers (hydrophobic polymer fibers) were not included. In the prepared catalyst ink, a composition ratio of the starting materials of carbon carrier:polymer electrolyte was 1:0.6 in mass ratio. In the solvent of the catalyst ink, the ratio of ultra pure water and 1-propanol was 1:1 by volume. Further, the solid content of the catalyst ink was adjusted to 15 mass %.

Substrate

A polytetrafluoroethylene (PTFE) sheet was provided as a substrate constituting a transfer sheet.

Method of Forming Electrode Catalyst Layer on Substrate

The catalyst ink prepared as described above was applied to the substrate by doctor blading, and then dried at 80° C. in air atmosphere. The applied amount of the catalyst ink was adjusted so that the supported platinum was present at 0.05 mg/cm$^2$ in the electrode catalyst layer on the fuel electrode (anode), and the supported platinum was present at 0.2 mg/cm$^2$ in the electrode catalyst layer on the air electrode (cathode).

Production of Membrane Electrode Assembly

The substrate on which the electrode catalyst layer as an anode was formed and the substrate on which the electrode catalyst layer as a cathode was formed were each punched out into 5 cm×5 cm pieces, and transferred onto respective surfaces of the polymer electrolyte membrane in the conditions of a transfer temperature of 130° C. and a transfer pressure of 5.0×10$^6$ Pa. Thus, a membrane electrode assembly of Comparative Example 2 was produced.

EVALUATION

Power Generation Performance

Samples were prepared by bonding carbon paper sheets as gas diffusion layers to both sides of each membrane electrode assembly obtained in Example 1, Comparative Examples 1 and 2. Each sample was placed in a power generation evaluation cell, and current-voltage measurement was performed by using a fuel cell measurement device. The cell temperature at the measurement was 65° C., and high humidity and low humidity as described below were used as the operating conditions. Further, hydrogen as a fuel gas was supplied at the flow rate at which the hydrogen utilization ratio was 90%, and air as an oxidant gas was supplied at the flow rate at which the oxygen utilization ratio was 40%. The back pressure was 50 kPa.

OPERATING CONDITIONS

Condition 1 (high humidity): relative humidity at anode 90% RH, cathode 80% RH

Condition 2 (low humidity): relative humidity at anode 90% RH, cathode 30% RH

MEASUREMENT RESULTS

The membrane electrode assembly produced in Example 1 showed better power generation performance under high humidity operating conditions compared with the membrane electrode assemblies produced in Comparative Examples 1 and 2. Further, the power generation performance of the membrane electrode assembly produced in Example 1 under high humidity operating conditions was the same level as that under low humidity operating conditions. In particular, the power generation performance at the current density of around 1.5 A/cm$^2$ was improved. The cell voltage at the current density of 1.5 A/cm$^2$ of the membrane electrode assembly produced in Example 1 was higher by 0.24 V than the cell voltage at the current density of 1.5 A/cm$^2$ of the membrane electrode assembly produced in Comparative Example 1. Further, the power generation performance at the current density of 1.5 A/cm$^2$ of the membrane electrode assembly produced in Example 1 was higher by 0.28 V than the cell voltage at the current density of 1.5 A/cm$^2$ of the membrane electrode assembly produced in Comparative Example 2.

From the results of the power generation performance of the membrane electrode assembly produced in Example 1 and the membrane electrode assemblies produced in Comparative Examples 1 and 2, it was found that the membrane electrode assembly of Example 1 had improved water release, and showed the power generation performance under high humidity operating conditions at the same level as that under low humidity operating conditions.

Moreover, under low humidity operating conditions, the cell voltage at the current density of 1.5 A/cm$^2$ of the membrane electrode assembly produced in Example 1 was higher by 0.29 V than the cell voltage at the current density of 1.5 A/cm$^2$ of the membrane electrode assembly produced in Comparative Example 1. Further, the power generation performance at the current density of 1.5 A/cm$^2$ of the membrane electrode assembly produced in Example 1 was higher by 0.31 V than the cell voltage at the current density of 1.5 A/cm$^2$ of the membrane electrode assembly produced in Comparative Example 2.

From the results of the power generation performance of the membrane electrode assembly produced in Example 1 and the membrane electrode assemblies produced in Comparative Examples 1 and 2, it was found that the membrane electrode assembly produced in Example 1 had enhanced water release for water generated by an electrode reaction, without impairing water retention under low humidity conditions.

REFERENCE SIGNS LIST

1 . . . Polymer electrolyte membrane; 2 . . . Electrode catalyst layer; 3 . . . Electrode catalyst layer; 4 . . . Gas diffusion layer; 5 . . . Gas diffusion layer; 6 . . . Air electrode (cathode); 7 . . . Fuel electrode (anode); 8a, 8b . . . Gas flow path; 9a, 9b . . . Cooling water flow path; 10a, 10b . . . Separator; 11 . . . Membrane electrode assembly; 12 . . . Polymer electrolyte fuel cell.

What is claimed is:

1. A membrane electrode assembly for use in a polymer electrolyte fuel cell, comprising:
   a polymer electrolyte membrane; and
   a pair of electrode catalyst layers sandwiching the polymer electrolyte membrane, wherein
   at least one of the electrode catalyst layers includes:
   catalyst-supporting particles consisting of (a) carrier particles; (b) a catalyst on the carrier particles and (c) a hydrophobic coating directly on an outermost surface of the catalyst;
   a polymer electrolyte; and
   hydrophobic polymer fibers.

2. The membrane electrode assembly of claim 1, wherein the hydrophobic polymer fibers have a mass of 0.05 times or more and 1.0 times or less a mass of a carrier in the catalyst-supporting particles.

3. The membrane electrode assembly of claim 1, wherein the hydrophobic polymer fibers have an average fiber diameter of 0.1 µm or more and 0.6 µm or less, and an average fiber length of 1 µm or more and 600 µm or less.

4. The membrane electrode assembly of claim 1, wherein the hydrophobic polymer fibers are proton-conductive.

5. A polymer electrolyte fuel cell, comprising:
   the membrane electrode assembly of claim 1;
   a pair of gas diffusion layers sandwiching the membrane electrode assembly; and
   a pair of separators facing each other with the membrane electrode assembly and the pair of gas diffusion layers interposed therebetween.

6. The membrane electrode assembly of claim 1, wherein the carrier particles consists of carbon.

7. A membrane electrode assembly for use in a polymer electrolyte fuel cell, comprising:
   a polymer electrolyte membrane; and
   a pair of electrode catalyst layers sandwiching the polymer electrolyte membrane, wherein
   at least one of the electrode catalyst layers includes:
   catalyst-supporting particles comprising (a) carrier particles; (b) a catalyst on the carrier particles and (c) a hydrophobic coating directly on an outermost surface of the catalyst;
   a polymer electrolyte; and
   hydrophobic polymer fibers.

8. The membrane electrode assembly of claim 7, wherein the hydrophobic polymer fibers have a mass of 0.05 times or more and 1.0 times or less a mass of a carrier in the catalyst-supporting particles.

9. The membrane electrode assembly of claim 7, wherein the hydrophobic polymer fibers have an average fiber diameter of 0.1 µm or more and 0.6 µm or less, and an average fiber length of 1 µm or more and 600 µm or less.

10. The membrane electrode assembly of claim 7, wherein the hydrophobic polymer fibers are proton-conductive.

11. A polymer electrolyte fuel cell, comprising:
    the membrane electrode assembly of claim 7;
    a pair of gas diffusion layers sandwiching the membrane electrode assembly; and
    a pair of separators facing each other with the membrane electrode assembly and the pair of gas diffusion layers interposed therebetween.

12. The membrane electrode assembly of claim 7, wherein the carrier particles consists of carbon.

* * * * *